(12) United States Patent
Kro

(10) Patent No.: US 7,443,118 B2
(45) Date of Patent: Oct. 28, 2008

(54) METHOD AND DEVICE FOR TRIGGERING AN ELECTRIC MOTOR

(75) Inventor: Sven-Jostein Kro, Ottersweier (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 326 days.

(21) Appl. No.: 11/085,846

(22) Filed: Mar. 22, 2005

(65) Prior Publication Data
US 2005/0212469 A1 Sep. 29, 2005

(30) Foreign Application Priority Data
Mar. 29, 2004 (DE) .................. 10 2004 015 212

(51) Int. Cl.
*H02P 1/18* (2006.01)
(52) U.S. Cl. .................. 318/254; 318/138; 318/439; 318/600
(58) Field of Classification Search .................. 318/254, 318/439, 138, 600, 603
See application file for complete search history.

(56) References Cited

U.S. PATENT DOCUMENTS 5,124,625 A * 6/1992 Wakabayashi .............. 318/603
2004/0036427 A1* 2/2004 Mitchell ..................... 318/254

* cited by examiner

*Primary Examiner*—Rina Duda
(74) *Attorney, Agent, or Firm*—Simpson & Simpson, PLLC

(57) ABSTRACT

The invention relates to a method for triggering an electric motor, in particular, an electrically conducting motor with a rotor, where an emergency run is performed as a function of the presence of at least one erroneous sensor signal. The invention also relates to a method for the correction of the counting of the increments in the course of an incremental path measurement to determine the position of a servo component that can be driven by the electric motor as a function of the presence of at least one erroneous sensor signal. The invention also relates to a device containing an electric motor with a rotor and with electronic sensors to acquire the position and direction of rotation of the rotor, whereby the electric motor can be triggered according to the disclosed method whereby the electric motor can be triggered as a function of the presence of at least one sensor signal error in the course of an emergency run.

19 Claims, 3 Drawing Sheets

METHOD AND DEVICE FOR TRIGGERING AN ELECTRIC MOTOR

CROSS REFERENCE TO RELATED APPLICATIONS

This patent claims priority of German Patent Application No. 10 2004 015 212.8, filed Mar. 29, 2004, which application is incorporated herein by reference.

FIELD OF THE INVENTION

This invention relates to a method for triggering an electric motor, in particular an electrically conducting motor with a rotor to perform an emergency running operation as a function of the presence of at least one defective sensor signal to determine the position of the rotor. The invention furthermore relates also to a device for the implementation of the method.

BACKGROUND OF THE INVENTION

When operating brushless electric motors, it is required to generate a desired motor torque to ensure error-free electronic commutation. Error-free electronic commutation presupposes a current supply to the various motor coils in the right direction and at the right moment.

For this purpose, it is necessary as accurately as possible to determine the position and direction of rotation of the rotor of the electric motor. The position of the rotor can be determined by especially using Hall sensors. For example, one can arrange Hall sensors in a manner staggered with respect to each other in the direction of rotation of the rotor. The position of the rotor can then definitely be determined on the basis of a Hall sensor signal pattern supplied by the Hall sensors. In other words, one rotation of the rotor corresponds to a certain sequence of Hall sensor signals.

Even if only one erroneous sensor signal is present, that will result in an erroneous rotor position determination. In light of traditional commutation, this causes the defective triggering of the electric motor so that the rotor cannot move at all and so that the electric motor cannot generate a torque.

To prevent any kind of trouble, it is therefore necessary—if defective sensor signals occur—to ensure the electronic commutation of the electric motor so that the electric motor can continue to be operated.

SUMMARY OF THE INVENTION

On this basis, it is the object of this invention to provide a method where, in case of a failure of sensor signals to determine the position of the rotor, one can facilitate the secure and reliable continued operation of the electric motor.

The invention provides a method for triggering an electric motor with a rotor, where the position and the direction of rotation of the rotor are acquired or determined by electronic sensor signals, where the acquired sensor signals are read in as a decimal equivalent, where a rotation of the rotor is acquired by a certain sequence of decimal equivalents and where the electric motor is triggered as a function of the position and the direction of rotation of the rotor, where, as a function of the presence of at least one faulty sensor signal, the electric motor is triggered by way of an emergency running method.

It is provided according to the invention that if at least one faulty sensor signal occurs, an emergency running procedure will be performed to trigger the electric motor. In that way, one can advantageously ensure an electronic commutation of the electric motor and one can thus guarantee that the electric motor will continue to operate.

BRIEF DESCRIPTION OF THE DRAWINGS

The nature and mode of operation of the present invention will now be more fully described in the following description of the invention taken with the accompanying drawing FIG, in which.

DETAILED DESCRIPTION OF THE PREFERRED EMBODIMENT

Figure 1:
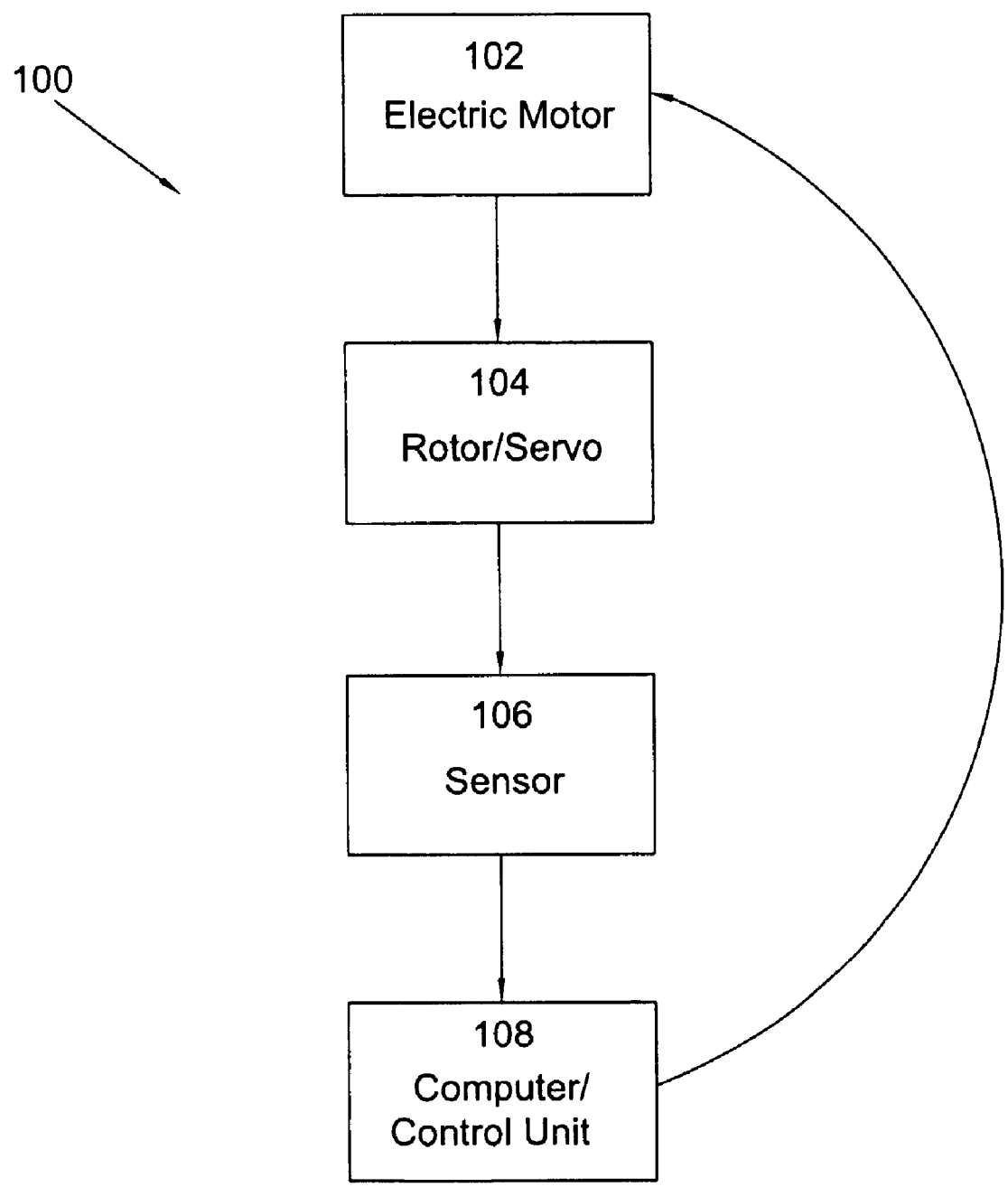
FIG. 1 is a block diagram of a present invention system for triggering an electric motor.

FIG. 1 is a block diagram of present invention system 100 for triggering an electric motor. System 100 includes electric motor 102 having a rotor 104. In a preferred embodiment, motor 102 is an electronically commutated motor. Sensors 106 are used to monitor the operation of rotor 104, for example, to detect the direction of rotation of the rotor and the position of the rotor and to send sensor signals including data regarding the direction and position of the rotor to computer/control unit 108. In a preferred embodiment (not shown), sensors 106 are three Hall sensors staggered with respect to each other by 1200 in the direction of rotation of the rotor. In general, motor 102 operates for a plurality of rotations of the rotor. Unit 108 receives sensor signals for a specified rotation of the rotor, and in some embodiments, also receives directional and positional data for a subsequent rotation of the rotor. In some embodiments, unit 108 stores a predetermined pattern of directional and positional data. 10009.31 Unit 108 controls, or triggers, the electric motor as a function of the sensor signals. Unit 108 compares the acquired sensor signals for the specified rotation of the motor with a pattern of sensor signals. The pattern is either the stored predetermined pattern or is formed from the directional and positional data for the subsequent rotation of the rotor. Unit 108 detects an erroneous sensor signal as a difference between the acquired sensor signals for the predetermined rotation and the pattern of sensor signals. If an error, or erroneous signal, is detected by unit 108 as a result of the comparison noted above, unit 108 activates an emergency run to trigger, or operate, the electric motor.

The following must be considered especially as possible sensor signal errors:

a short-circuit to the ground, a short-circuit upward (+5 volt or +12 volt)

a broken cable.

In case of a short-circuit to the ground, a Hall sensor signal, expressed by way of the binary code, produces "0" ("stuck low"), whereas a short-circuit upward produces a Hall sensor signal expressed by way of the binary code as "1" (stuck high"). In case of a broken cable, the faulty Hall sensor signal appears as a function of the control unit expressed either in the binary code as "0" ("stuck low") or as "1" ("stuck high").

According to one embodiment of the invention, at least one faulty sensor signal exists when the acquired sequence contains at least one decimal equivalent that displays a predetermined value, which deviates from a predetermined expectancy value.

The invention-based triggering of the electric motor by way of an emergency running procedure in the presence of sensor signal errors first of all presupposes the identification of a situation in which at least one faulty sensor signal exists.

According to the invention, upon rotation of the rotor, each acquired sensor signal pattern is read in via a binary code as a decimal equivalent with a certain decimal value, which, in each particular case, is to be matched up with a certain rotor position. In case of error-free routine commutation, one can in this fashion acquire one revolution of the rotor by way of a certain sequence of decimal equivalents that consist of a certain sequence of decimal values. This sequence can be referred to as a normal sequence or as a correct sequence.

According to the invention, for error identification, one examines certain characteristic magnitudes such as especially the sequence length and the occurrence of certain values within an acquired sequence that deviate from the stored expectancy values derived from the last correctly acquired sequences.

Error identification is performed according to the invention, especially by means of a comparison of the sequence of the read-in decimal values with the correct sequence of expectancy values. Here, in case of error-free routine commutation operation, a certain number of correctly acquired decimal equivalents will be stored as a correct sequence of certain expectancy values. The correct sequence of expectancy values, for example, can be stored in a ring buffer.

The number of the decimal equivalents that are read in and that have to be stored to guarantee reliable error identification will depend on how the process of error identification is to be shaped. Sufficient reliability of error identification exists when a number of last correctly read-in decimal equivalents is stored, which number corresponds roughly to double the sequence length. This results from the fact that the erroneously acquired sequences display a shorter sequence length than the correctly acquired sequences. This means that a ring buffer with a storage space that comprises two correctly acquired sequence lengths is adequate for reliable error identification. By way of example, during routine error-free operation where one gets a sequence length of six decimal equivalents, the last twelve correctly read-in decimal values can be stored. According to the invention, one can reliably recognize at least one faulty sensor signal on the basis of the read-in decimal values in this fashion.

Advantageously, the presence of a faulty sensor signal is recognized when the acquired sequence consists of four decimal equivalents and when one decimal equivalent displays a predetermined value that deviates from a predetermined expectancy value.

According to a preferred embodiment of the invention-based method, the latter is provided for the triggering of an electrically conducting motor where there are arranged three Hall sensors H1, H2 and H3 staggered with respect to each other by 120° in the direction of rotation of the rotor. The three Hall sensor signals that are obtained upon one rotation of the rotor, in each case when the rotor is in a certain position, are read in as a decimal equivalent with a certain decimal value. When the signals from the Hall sensors H3 are valued as "4," H2 as "2" and H1 as "1," then during error-free routine operation upon one rotation of the rotor, one can read in the sequence of six decimal equivalents (gray shading) as given in the table below:

|   |   |   |   |
|---|---|---|---|
| 0 | 1 | 0 | ▨ |
| 1 | 1 | 0 | ▨ |
| 1 | 0 | 0 | ▨ |
| 1 | 0 | 1 | ▨ |
| 0 | 0 | 1 | ▨ |
| 0 | 1 | 1 | ▨ |

This sequence can be described as a normal or correct sequence. The correct sequence contains the expectancy values (gray shading) given in the table, which characterize error-free operation.

Upon rotor rotation, each decimal equivalent that is read in determines one rotor position and therefore can also be described as a state.

In case of a faulty Hall sensor signal, the acquired sequence contains only four decimal equivalents, whereby one of them displays a faulty value "0" or "7" that can be directly recognized when compared to the correct sequence. The following tabular presentation shows the sequences that might develop during the possible individual error situations when a Hall sensor displays the error "stuck low" or the error "stuck high," whereby the corresponding expectancy values of the correct sequence are given for a comparison in any kind of state.

|                |   |   |   |   |   |   |   |   |   |   |
|----------------|---|---|---|---|---|---|---|---|---|---|
| H4 "stuck low" | 1 | 3 | 2 |   |   |   | 1 | 3 | 2 |   |
| H2 "stuck low" | 1 |   |   |   | 4 | 5 | 1 |   |   | 4 | 5 |
| H1 "stuck low" |   |   | 2 | 6 | 4 |   |   |   | 2 | 6 | 4 |
| H4 "stuck high"|   |   |   | 6 | 4 | 5 |   |   |   | 6 | 4 | 5 |
| H4 "stuck high"|   | 3 | 2 | 6/|   |   |   | 3/| 2 | 6 |   |
| H4 "stuck high"| 1 | 3 |   |   | 5 | 1 | 3 |   |   | 5 |

▢ correct
▨ faulty–can be recognized directly on 0/7
▨ faulty–not directly recognizable
/ Example: unrecognizable state transitions The table shows that each individual error situation yields a characteristic sequence of decimal equivalents. The correctly acquired states are marked with a white background and the incorrectly acquired states are marked with a gray background, in which a light-gray shading means that the faulty state can be recognized directly, while a dark-gray shading shows that the error cannot be directly recognized.

Furthermore, the corresponding expectancy value of the correct sequence is given for each Hall position.

The illustration furthermore shows that two states occur falsely repeatedly in a sequence in any possible individual error situation. These states involve so-called "double states" that are not directly identifiable (for example, marked with a slash ("/") in the table). A "double state" prevails when two successively read-in decimal equivalents display the same decimal value in one sequence. Then the two states contained in a double state cannot be differentiated from each other and a state change is not recognized. A double state therefore is read in as a state, whereby one part of the read-in state is correct and the other part is faulty.

The next table illustrates the sequences acquired by the control in the mentioned error situation, considering the not directly recognizable "double states".

| Situation | Hall Position | | | | | | | |
|---|---|---|---|---|---|---|---|---|
| H4 "stuck low" | | 3 | | 0 | | 3 | | 0 | | 3 | | 0 |
| H2 "stuck low" | | 0 | | 5 | | 0 | | 5 | | 0 | | 5 |
| H1 "stuck low" | 0 | | 6 | | 0 | | 6 | | 0 | | 6 |
| H4 "stuck high" | | 7 | | 4 | | 7 | | 4 | | 7 | | 4 |
| H2 "stuck high" | | 2 | | 7 | | 2 | | 7 | | 2 | | 7 |
| H1 "stuck high" | 1 | | 7 | | 1 | | 7 | | 1 | | 7 |

States consisting of 2 states ("double" states)
Normal states

The seeming shortening of the sequence length to four decimal equivalents as against the correct sequence consisting of six decimal equivalents is explained by the fact that the acquired faulty sequence contains two so-called "double states" that have a gray shading in the table and that are not directly identifiable for the control.

The error situation "stuck low" exists when the value "0" shows up in a sequence. The error situation "stuck high" exists when the sequence contains the value "7."

A faulty sensor signal exists when the acquired sequence thus at one time contains the value "0" or the value "7" and if the latter has a sequence length of four, whereby the value "0" or the value "7" will occur periodically for every four of the acquired decimal equivalents. In that way, one can identify a faulty Hall sensor signal in a simple manner in accordance with the invention.

In an advantageous development of the method, the rotor's direction of rotation will be recognized on the basis of the sequence of the decimal equivalents that are read in.

According to a further development of the method involved in the invention, the presence of two equally faulty sensor signals is identified when the acquired sequence consists of two decimal equivalents and displays a predetermined value that deviates from a predetermined expectancy value.

When both erroneous Hall sensors "uniformly" display the error "stuck low" or the error "stuck high," then one faces two uniformly erroneous sensor signals. The table below illustrates the sequences for the possible individual error situations that might occur in the presence of two uniformly error-tainted Hall sensors.

| | | | | | | |
|---|---|---|---|---|---|---|
| H4 + H2 "stuck low" | 1 | | | 1 | | |
| H2 + H1 "stuck low" | | | 4 | | | 4 |
| H1 + H4 "stuck low" | 2 | 2 | | | 2 | |
| H4 + H2 "stuck high" | | | 6 | | | 6 |
| H4 + H1 "stuck high" | 3 | | | 3 | | |
| H1 + H4 "stuck high" | | | | 5 | | 5 | correct
faulty – can be recognized directly on 0/7
faulty – not directly recognizable As one can see from the table, during each possible individual error situation in each sequence, there occurs a correct value in combination with a faulty value "0" or "7" that deviates from the corresponding expectancy value of the correct sequence. Here, the value "0" or the value "7" will show up repeatedly in each second acquired state.

In addition, the acquired sequence appears to be shortened with a length of two decimal equivalents as compared to the correct sequence length of six expectancy values. The apparent shortening of the sequence length can be explained in that the erroneous sequence contains four states that are not directly identifiable.

In this way according to the invention and on the basis of the acquired sequence length and the occurrence of the erroneous values "0" or "7," one can reliably recognize the presence of two uniformly error-tainted Hall sensors in one sequence.

According to an additional embodiment of behind the invention, the electric motor is triggered with a substitute value formed for the decimal equivalent that displays the predetermined value in the presence of at least one erroneous sensor signal.

According to the invention, in the presence of at least one erroneous sensor signal, a substitute value with the decimal value "0" or "7" is formed for the decimal equivalent that was erroneously read in and that was contained in the acquired sequence.

The substitute value, for example, can be determined by way of a comparison of the acquired sequence with the expectancy values of the correct sequence stored in a memory.

Accordingly, it is provided that the electric motor is triggered by way of an emergency running procedure with a substitute value that is formed for the erroneous value "0" or "7" as identified in the acquired sequence. This means that in the states that are recognized as being erroneous, the electric motor is triggered according to the substitute value and, as for the rest, according to the decimal values of the states that are read in correctly.

In this way, one can ensure adequate commutation of the electric motor by way of an emergency running procedure in the presence of erroneous sensor signals and one can reliably continue to operate the motor.

The substitute value is calculated by way of an advantageous development of the method.

If the erroneous decimal values "0" or "7" are read into a sequence, then according to the invention for these particular states, the substitute values can be calculated from the decimal value of at least one decimal equivalent that is contained in the sequence and that was correctly read in.

Preferably, the substitute value is determined by the invention-based calculation when the substitute value for the erroneous states cannot be determined by a comparison with the expectancy values of the correct sequence that are stored in a memory.

For example, the substitute value can be calculated according to the following formula:

$$EW=7-X$$

where EW designates the substitute value and X designates the decimal value of a correctly acquired decimal equivalent from the sequence.

Another inventive development of the process provides that in case of the presence of an erroneous sensor signal, the substitute value be calculated according to the formula:

$$EW=7-X$$

whereby EW represents the substitute value and X represents the decimal value of a correctly acquired decimal equivalent from the sequence and the magnitude of X corresponds to the decimal value of the decimal equivalent that in the counting sequence is read in as the second-in-line of the acquired sequence according to the decimal equivalent that displays the predetermined value.

The invention-based method will now be explained by way of exemplary embodiment with reference to the tabular illustration to follow. In the presence of an erroneous sensor signal, the calculated substitute values are given there for the erroneous values "0" or "7" that are contained in the sequences of the possible individual error situations.

| | | | | | | | | | | | | | |
|---|---|---|---|---|---|---|---|---|---|---|---|---|---|
| H4 "stuck low" | 1 | 3 | 2 | | | 1 | 3 | 2 | | | | | 4 |
| H2 "stuck low" | 1 | | | 4 | 5 | 1 | | | 4 | 5 | 2 | | |
| H1 "stuck low" | | 2 | 6 | 4 | | | 2 | 6 | 4 | | | 1 | |
| H4 "stuck high" | | | 6 | 4 | 5 | | | 6 | 4 | 5 | 3 | | |
| H2 "stuck high" | | 3 | 2 | 6 | | | 3 | 2 | 6 | | | 5 | |
| H1 "stuck high" | 1 | 3 | | | 5 | 1 | 3 | | | 5 | 6 | | |

If, for example, when the Hall sensor H2 shows the error "stuck low," one forms for the erroneous value "0" a substitute value according to the abovementioned formula E=7-X; then in this case, we get a value of "5" for X, which value corresponds to the decimal value of the decimal equivalent that is read in correctly as second-in-line. Here it must be kept in mind that the "double state" that follows the directly recognizable value "0" is not directly identifiable and is read in as a state. For the substitute value, one then calculates:

$$EW=7-5=2.$$

The calculated substitute value "2" is equivalent to the corresponding expectancy value of the correct sequence for the faulty value "0" in the acquired sequence.

In this way, according to the invention, one can calculate substitute values also in the other individual error situations for the erroneous values "0" or "7" that are contained in the sequence that was read in, which substitute values correspond to the pertinent expectancy values of the correct sequence during error-free operation.

In that way, one can make sure that the electric motor can be correctly triggered by way of an emergency running procedure in the erroneous states "0" and "7."

According to another advantageous development of the method, it is provided that the substitute value is to be calculated according to the following formula:

$$EW=7-X$$

when there are two uniformly erroneous sensor signals where EW designates the substitute value and X represents the decimal value of a correctly acquired decimal equivalent from the sequence and the magnitude X corresponds to the decimal value of the decimal equivalent that is read in during the counterphase with respect to the value that displays the predetermined value.

The invention-based principle will be explained by way of exemplary embodiment, referring to the tabular illustration below. When two erroneous sensor signals are present, the calculated substitute values are given there for the erroneous values "0" or "7" that are contained in the sequences of the possible individual error situations.

| | | | | | | | |
|---|---|---|---|---|---|---|---|
| H4 + H2 "stuck low" | 1 | | | 1 | | | 6 |
| H2 + H1 "stuck low" | | | 4 | | | 4 | 3 |
| H1 + H4 "stuck low" | 2 | 2 | | | 2 | | 5 |
| H4 + H2 "stuck high" | | 6 | | | 6 | | 1 |
| H2 + H1 "stuck high" | 3 | | | 3 | | | 4 |
| H1 + H4 "stuck high" | | | 5 | | | 5 | 2 |

When, for example, the Hall sensor signals H2 and H1 display the error "stuck low," one forms for the erroneous value "0" a substitute value according to the formula E=7-X; then in this case for the magnitude X, one gets the value "4" that corresponds to the decimal value of the decimal equivalent that is read during the counterphase to the erroneous value 0. For the substitute value, one then calculates:

$$EW=7-4=3.$$

In this way, according to the invention, one can calculate substitute values also in the other individual error situations for the erroneous values "0" or "7" that are contained in the sequence that was read in, which substitute values correspond to the pertinent expectancy values of the correct sequence during error-free operation.

In that way, one can make sure that the electric motor can be correctly triggered by way of an emergency running procedure in the erroneous states "0" and "7."

Finally, according to an advantageous development of the invention, it is also possible to identify the presence of two unevenly erroneous sensor signals when the acquired sequence consists of two decimal equivalents and when a plausibility test shows an error.

When there are two unevenly erroneous sensor signals, then one of the Hall sensors is tainted with the error "stuck low" and another Hall sensor is tainted with the error "stuck high." In this case, the acquired sequence consists of two decimal equivalents that are correctly read in and that do not deviate from the corresponding expectancy values and that occur alternatingly and repeatedly.

There is no clearly recognizable error state in this error situation. One can only identify an alternation between two correctly acquired states. To identify the error, one requires an additional plausibility test that compares the determined given values to the values that are read back and that in case of deviations will establish an error. Plausibility can, for example, be accomplished in the following manner: The electric motor is triggered with determined given values for which one knows the adjustment movement of a servo component that can be driven by the electric motor and one then checks to see whether the predetermined adjustment position is attained.

The table below illustrates all possible individual error situations in the presence of two unevenly erroneous sensor signals.

| Error states | Hall Signals |   |   |   |   |   |   |   |
|---|---|---|---|---|---|---|---|---|
| Correct signals | 0 | 1 | 2 | 3 | 4 | 5 | 6 | 7 |
| H4 "stuck high" |   |   |   | 4 | 5 |   |   | 4 | 5 |
| H2 "stuck low" |   |   |   |   |   |   |   |   |
| H2 "stuck high" |   |   | 2 | 6 |   |   | 2 | 6 |   |
| H1 "stuck low" |   |   |   |   |   |   |   |   |
| H1 "stuck high" | 1 | 3 |   |   | 1 | 3 |   |   |
| H4 "stuck low" |   |   |   |   |   |   |   |   |
| H4 "stuck low" |   | 3 | 2 |   |   | 3 | 2 |   |
| H2 "stuck high" |   |   |   |   |   |   |   |   |
| H2 "stuck low" | 1 |   |   | 5 | 1 |   |   | 5 |
| H1 "stuck high" |   |   |   |   |   |   |   |   |
| H1 "stuck low" |   |   | 6 | 4 |   |   | 6 | 4 |
| H4 "stuck high" |   |   |   |   |   |   |   |   |

As one can see from the illustration, the sequence consists of two correctly acquired states that are repeated constantly. One state is "1," "2" or "4" (binary 1-bit state). The second acquired state shows the value "3," "5" or "6" (binary 2-bit state).

One can determine which sensor signals are erroneous on the basis of the two acquired states:

In the 1-bit state "1," "2" or "4,", one can determine on the basis of the acquired state which signal sensor displays the error "stuck high":

acquired state "1": H1 "stuck high";
   acquired state "2": H2 "stuck high";
   acquired state "4": H3 "stuck high."

In the 2-bit state with the values "2," "5" or "6," the erroneous Hall sensor signal can be identified by the formula:

$$H = 7 - D,$$

whereby H indicates the disturbed Hall sensor signal (H1, H2 or H3) and D indicates the decimal value of the acquired state. Accordingly, we get the following:

acquired state "3": H4 "stuck low";
   acquired state "5": H2 "stuck low";
   acquired state "6": H1 "stuck low."

An inventive development of the method provides the following: When at least one erroneous sensor signal is present, the electric motor is triggered in at least one acquired state with alterable substitute values during time intervals with a predetermined time duration.

If a Hall sensor displays the error "stuck low" or "stuck high," then no sensor signal is transmitted in case of one rotation of the rotor in the position in which the sensor would supply a pulse in case of error-free operation. During the acquisition of the sensor signals, this results in the appearance of so-called "double states" in one sequence. As a result, the electric motor is triggered erroneously with two out of six states of one sequence. The commutation of the electric motor in four out of six states is erroneous when two Hall sensor signals are jammed.

For the invention-based method, one uses the circumstance to the effect that the erroneous and correct parts of a "double state" are known. The defective parts of a "double state" occur regularly and after the states "0" or "7." Furthermore, the erroneously acquired sequence, as shown earlier, displays a shortened sequence length of only four states as compared to the correct sequence length of six states. The following is therefore provided according to the invention by way of example: The defective parts of the "double states" are determined from a comparison of the acquired sequence with the expectancy values that are stored in the memory and that correspond to the correct sequence.

Only the moment of transition between the correct and the erroneous state is not known.

According to the invention, the following is therefore also provided: In the "double states," the periods with erroneous triggering are shortened by means of a time measurement or a counter. This is achieved in the following manner: The electric motor is triggered in these states according to a certain time duration.

Furthermore, according to the invention in this error situation, one can determine the substitute values for the particular jammed part of the "double states."

By way of example, if a "double state" occurs, the electric motor can be triggered according to the measured time duration of the last-acquired correct state change with the help of a substitute value.

In this way, one can achieve a definitely improved commutation of the electric motor in this error situation. Completely correct triggering is possible if one assumes a constant rotor revolution number.

Here is an advantageous development of the method: The electric motor is triggered with alterable substitute values during two time intervals, whereby said time duration in each case corresponds to the time duration of the last correctly acquired state when an erroneous sensor signal exists and when two states with the same decimal value are acquired.

The tabular illustration below shows the substitute values EW that are calculated according to the invention for the disturbed states, that is to say, the "double states" and the states "0" or "7" in case of the existence of an erroneous sensor signal in all possible individual error situations.

| Situation Signal | Hall Position | | | | | | | | | | Disturbed | Substitute Value |
|---|---|---|---|---|---|---|---|---|---|---|---|---|
| H4 "stuck low" | 1 | 3 | 2 | | | 1 | 3 | 2 | | | "2" | 6 |
| | | | | | | | | | | | "0" | 4 |
| | | | | | | | | | | | "1" | 5 |
| H2 "stuck low" | 1 | | | 4 | 5 | 1 | | | 4 | 5 | "1" | 3 |
| | | | | | | | | | | | "0" | 2 |
| | | | | | | | | | | | "4" | 6 |
| H1 "stuck low" | | | 2 | 6 | 4 | | | 2 | 6 | 4 | "4" | 5 |
| | | | | | | | | | | | "0" | 1 |
| | | | | | | | | | | | "2" | 3 |
| H4 "stuck high" | | | 6 | 4 | 5 | | | 6 | 4 | 5 | "5" | 1 |
| | | | | | | | | | | | "7" | 3 |
| | | | | | | | | | | | "6" | 2 |
| H2 "stuck high" | | 3 | 2 | 6 | | | 3 | 2 | 6 | | "6" | 4 |
| | | | | | | | | | | | "7" | 5 |
| | | | | | | | | | | | "3" | 1 |
| H1 "stuck high" | 1 | 3 | | | 5 | 1 | 3 | | | 5 | "3" | 2 |
| | | | | | | | | | | | "7" | 6 |
| | | | | | | | | | | | "5" | 4 |

Only four states are acquired in each sequence in this error situation.

The invention-based method will be explained below by way of example with reference to an illustration for the case where the Hall sensor H4 displays the error "stuck low" and the Hall sensor [number omitted] displays the error "stuck high."

The "double states" "2" and "1," respectively, "3" and "5" (dark-gray shading) cannot be identified directly. According to the invention, the time duration of each acquired state, that is to say, the period of time between two state changes is measured. When a "double state" occurs, then after the time duration of the last-acquired state, the electric motor is triggered with the calculated substitute value. For example, the period of time between the state change from state "1" to state "3" and the state change from state "3" to state "2" is measured. A counter is started up after the state change from state "3" to state "2." After the measured time duration for the last-acquired state "3," the electric motor is triggered with the substitute value calculated according to the invention for the disturbed state "2" according to the formula:

where X designates the decimal value of the decimal equivalent that in the counting sequence of the sequence is acquired as the second-in-line after the decimal equivalent with the decimal value "0" or "7."

$$EW = 7 - X = 7 - 1 = 6,$$

where X designates the decimal value of the decimal equivalent that in the counting sequence of the sequence is acquired as the second-in-line after the decimal equivalent with the decimal value "0" or "7."

According to the invention, it is provided that the time duration of each acquired state be measured continually. In this way, one can take into consideration any current changes in the numbers of revolutions of the rotor.

According to the invention, the substitute value can also be determined from a comparison of the acquired states with the corresponding expectancy values of the correct sequence that are stored in a memory.

According to the invention, the electric motor is triggered advantageously when two erroneous sensor signals are present during each acquired state with alterable substitute values during three time intervals, whereby the time duration in each case corresponds to one-third of the time duration of the state that is acquired last.

In this error situation, one deals either with two uniformly erroneous sensor signals or two unevenly erroneous sensor signals.

The invention-based method will first of all be explained in case of the presence of two uniformly erroneous sensor signals with reference to an example.

The error situations H4 and H2 "stuck low" and H2 and H1 "stuck high" for this purpose are illustrated by way of example in the table below.

| Situation Signal | Hall Position | | | | | | |
|---|---|---|---|---|---|---|---|
| H4 + H2 "stuck low" | 1 | | | | 1 | | |
| H2 + H1 "stuck high" | | 3 | | | | 3 | |

This sequence contains only two identifiable states. Of these states, one acquired state always displays the value "0" or "7." A comparison with the expectancy values of the correct sequence given in the illustration shows that the two acquired states in each case are correct to the extent of one-third and are erroneous to the extent of two-thirds.

The following is provided here according to the invention: The parts of an acquired state, recognized as erroneous, are correctly identified by means of a given direction and a comparison of the acquired states of the erroneous sequence with the corresponding expectancy values of the correct sequence that are stored in a memory. The rotor's direction of rotation must be given in advance because, in this error situation, the rotor's direction of rotation cannot be recognized.

The following is furthermore provided according to the invention: The time duration of a last-acquired state of the erroneous sequence to which correspond three states of the correct sequence is measured. The triggering of the electric motor can then be corrected with the help of the acquired time duration during the following three states. During each acquired state every time according to one-third of the time duration of the previously acquired state, the electric motor is triggered with the expectancy value of the correct sequence, which value corresponds to the particular state. The expectancy value corresponding to the particular state here can be determined by comparison of the acquired states with the expectancy values of the correct sequence that are stored in a memory.

The invention-based method will be explained below by way of example with reference to the error situations H2 and H1 "stuck high" that are contained in the above illustration. One measures the period of time between the state change from state "7" to state "3" and the state change from state "3" to state "7." The measured time duration corresponds to the time duration of an acquired erroneous state that contains three unidentified states. After the last-acquired state change from "3" to "7," one starts a counter, and in a first third of the time duration measured above, the electric motor is triggered with the corresponding expectancy value "6" of the correct sequence, and in a second third, the electric motor is triggered with the corresponding expectancy value "4" of the correct sequence, and in the last third, the electric motor is triggered with the corresponding expectancy value "5" of the correct sequence. After the subsequently acquired state change from "7" to "3," the method is continued in a similar manner with the corresponding substitute values with possibly altered measured time duration for the last-acquired state. The invention here furthermore provides the following: The time duration of each acquired state is measured continually so that one can take into consideration any current fluctuations in the number of rotations of the rotor.

The diagram below illustrates the invention-based emergency running procedure by way of time sequence as an example for error situations H4 and H2 "stuck high"; the horizontal length of the acquired states, indicated by the rectangular surfaces, show the time duration of those states.

| Correct sequence | 2 | 6 | 4 | 5 | 1 | 3 | 2 |
|---|---|---|---|---|---|---|---|
| Acquired sequence | | 6 | | | 7 | | 6 |
| With substitute value | | 6 | | | 1 | | 6 |
| With direction of rotation and known sequence | 2 | 6 | 4 | 5 | 1 | 3 | 2 |
| With time measurement | 2 | 6 | 4 | 5 | 1 | 3 | 2 |

The first line of the table illustrates the correct sequence. The second line shows the sequence acquired during the given error situation. The third line presents an invention-based emergency running procedure where the electric motor is triggered with a substitute value in the directly identifiable erroneous states "0" or "7." Furthermore, the fourth line illustrates an emergency operating procedure where the electric motor is triggered during each acquired state with the corresponding expectancy values of the correct sequence without any time measurement. The last line shows the invention-based emergency procedure with a time measurement in each acquired state and a triggering of the electric motor with the corresponding expectancy values of the correct sequence at time intervals with a time duration that in each case corresponds to one-third of the time duration of a last-acquired state, whereby one assumes that the rotor has a constant number of revolutions in this illustration.

Looking at the illustration from a comparison with the correct sequence illustrated in the first line, one can recognize that the invention-based emergency running procedure will guarantee correct commutation of the electric motor, assuming a constant rotor revolution number in case of two uniformly erroneous sensor signals.

The acquired sequence contains only two correct states that occur repeatedly and alternatingly when there are two unevenly erroneous sensor signals.

According to the invention, the following may therefore be practical: The electric motor is triggered with an expectancy value of the correct sequence corresponding to a substitute value after one-third of the time duration of an acquired state in the above-described manner and the time duration of each acquired state is measured continually in order to be able to taken into consideration any current changes in the number of revolutions of the rotor.

In that way, one can improve the triggering of the electric motor in an emergency running procedure also in case of the occurrence of two unevenly erroneous sensor signals and one can reliably continue to operate the electric motor.

The following is provided according to the invention by way of an inventive development of the method: When there are two unevenly erroneous sensor signals, the substitute value for a disturbed 2-bit state corresponds to the valence of the undisturbed sensor signal, and for a disturbed 1-bit state, the substitute value corresponds to the sum of the valence of the two disturbed sensor signals.

The table below shows the substitute values determined according to the invention for the disturbed states in case of the presence of two unevenly erroneous sensor signals for all possible individual error situations.

state change is not recognized, that is to say, the incremental path measurement, this would be tainted with the error of an increment that is not counted upon every appearance of a "double state."

| Situation / Sensor signals | Ideal Position | | | | | | | | Incremental states | Substitute values |
|---|---|---|---|---|---|---|---|---|---|---|
| H4 "stuck high" | | | | 4 | 5 | | | 4 5 | "4" | 6 |
| H2 "stuck low" | | | | | | | | | "5" | 1 |
| H2 "stuck high" | | 2 | 6 | | | | 2 6 | | "2" | 3 |
| H1 "stuck low" | | | | | | | | | "6" | 4 |
| H1 "stuck high" | 1 | 3 | | | 1 3 | | | | "1" | 5 |
| H4 "stuck low" | | | | | | | | | "3" | 2 |
| H4 "stuck low" | 3 | 2 | | | 3 2 | | | | "2" | 6 |
| H2 "stuck high" | | | | | | | | | "3" | 1 |
| H2 "stuck low" | 1 | | | 5 1 | | | 5 | | "1" | 3 |
| H1 "stuck high" | | | | | | | | | "5" | 4 |
| H1 "stuck low" | | | 6 | 4 | | 6 4 | | | "4" | 5 |
| H4 "stuck high" | | | | | | | | | "6" | 2 |

The invention-based method will be explained below by way of example with reference to the error situations H4 "stuck high" and 12 "stuck low."

The illustration shows that in the given error situation in one sequence, one acquires only two correct states "4" and "5" that are repeated alternatingly.

The state "5" corresponds to a 2-bit state and the state "4" corresponds to a 4-bit state.

According to the invention, an emergency run can be performed in this error situation in that for both states, one uses substitute values, whereby in the 2-bit state "5," the substitute value is determined by the valence of the undisturbed sensor signal $$EW = H1 = 1.$$

For the 1-bit state "4," the substitute value is determined from the sum of the valences of the two signals H3=4 and H2=2 so that one gets the substitute value $$EW = 4 + 2 = 6.$$

Here is an inventive development of the method: The counting of the increments in the incremental path measurement is corrected during each change of a decimal equivalent in the presence of at least one erroneous sensor signal in the course of an incremental path measurement to determine the position of a servo component that can be driven by the electric motor, whereby each change of a decimal equivalent is counted as one increment.

Not directly identifiable erroneous "double states" also turn up in the sequence along with the directly identifiable values "0" and "7" when one or two sensor signals are disturbed. As noted earlier, these states cannot be differentiated from each other and a state change is not recognized so that they are read in as one state. In case of a conventional incremental path measurement where the reading-in of each decimal equivalent is counted as an increment, in each case an increment would not be counted, therefore upon every appearance of a "double state" in which, as noted earlier, a state change is not recognized, that is to say, the incremental path measurement, this would be tainted with the error of an increment that is not counted upon every appearance of a "double state."

In the presence of an erroneous sensor signal, the "double states" occur in a sequence in each case before and after the reading-in of an erroneous value "0" or "7." Only two states out of six states are recognized in each sequence when there are two erroneous sensor signals, as noted earlier. In these error situations, it is therefore required to correct the counting of the increments in the incremental path measurement, for example, by counting additional unrecognized increments.

According to the invention, therefore, in the presence of an erroneous sensor signal, two increments are counted upon each change to and from the predetermined value.

Only four out of the six decimal equivalents in a correct sequence are acquired in case of an erroneous sensor signal. Here is why: Each sequence contains two "double states" that are not directly identifiable and they occur in each case before and after the reading-in of the abovementioned erroneous values "0" or "7" and the latter are definitely identifiable.

The following is therefore provided according to the invention: The incremental path measurement is corrected during an emergency run by counting two increments upon each state change to and from the states "0" or "7," whereby in the other acquired states, a counting is made of one increment per state change according to the normal method as in the case of an error-free operating mode.

Figure 2:
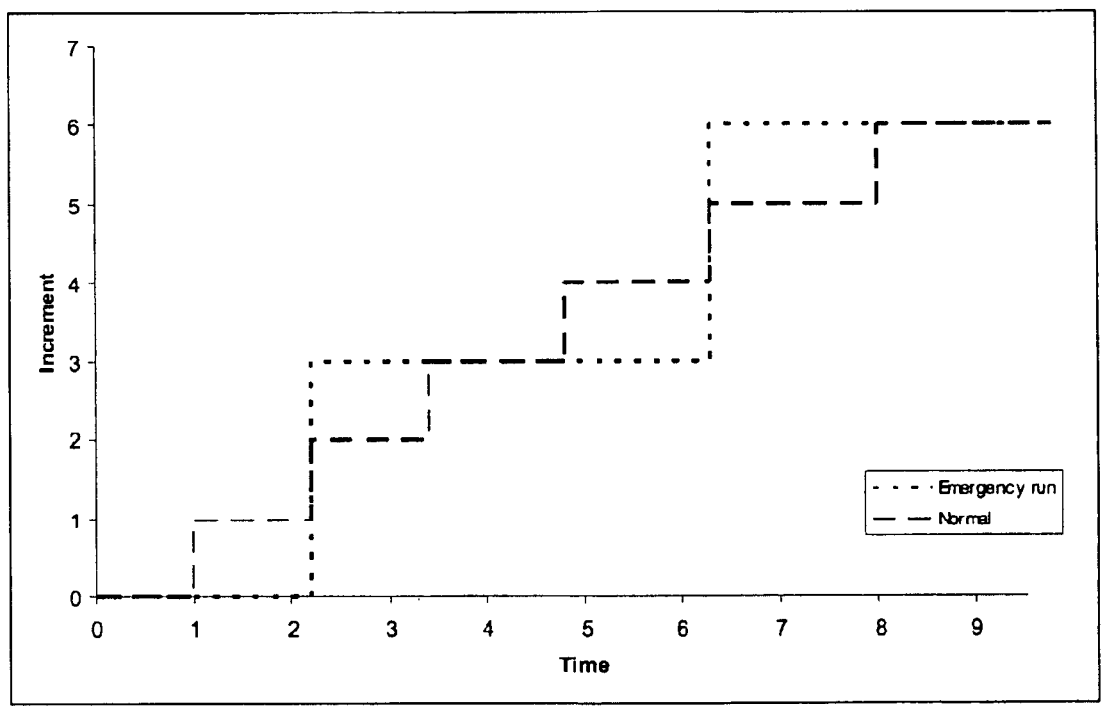
FIG. 2 is a graph showing a comaprison of the incremental path measurement During normal error-free operation and in an emergency run; and, FIG. 3 is a graphic comparison between the incremental path measurement during normal error-free operation and during the emergency run in case of two uniformly erroneous measurement signals.

FIG. 2 shows a comparison of th incremental path measurement during normal error-free operation and in an emergency run.

As one can see from FIG. 2, the emergency run results in an Accuracy of the +/−one incremental path measurement.

As one can see from the drawing, the emergency run results in an accuracy of +/− one increment in the incremental path measurement.

In another advantageous embodiment of the method when there are two erroneous sensor signals, three increments are counted every time a decimal equivalent is read in.

In case of two uniformly erroneous or two unevenly erroneous sensor signals, then, per sequence out of the six states present during error-free operation, only two are acquired because each sequence contains four states that cannot be directly identified.

According to the invention, it is provided in this error situation to count three increments in the incremental path measurement upon each acquired state change.

In this way, the unidentified state changes can be taken into consideration in the counting of the increments.

Figure 3:
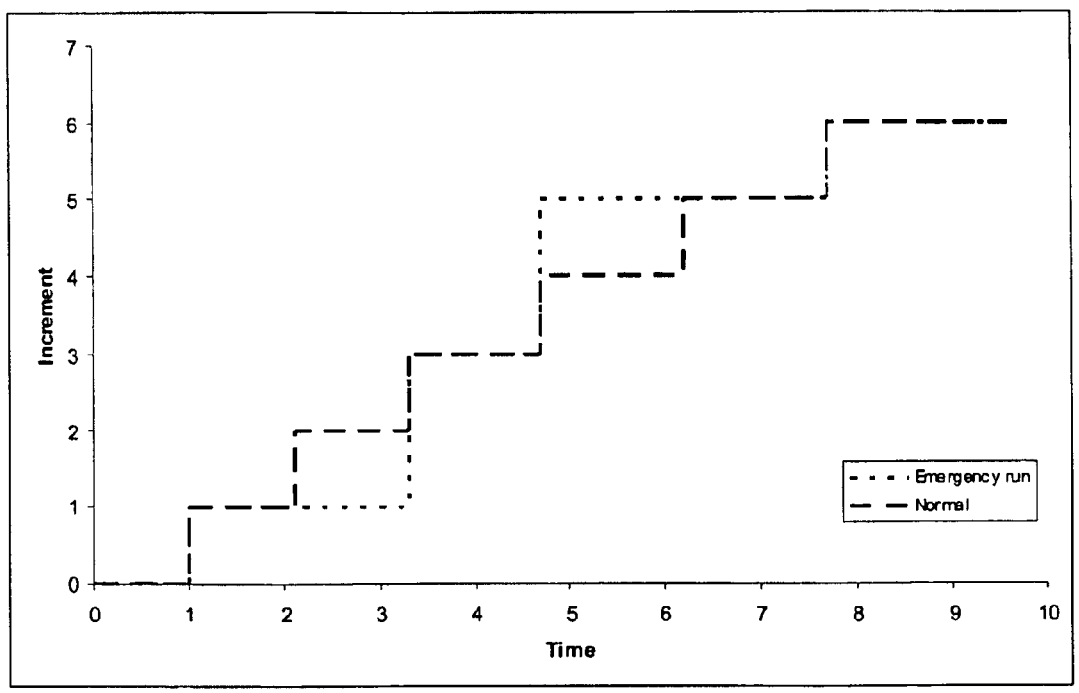

FIG. 3 presents a graphic comparison between the incremental path measurement during normal error-free operation and during the emergency run in case of two uniformly erroneous measurement signals.

The graphic comparison in FIG. 3 shows that an accuracy of incremental path measurment of +/−one increment is attained during the emergency run.

The illustration below presents a graphic comparison between the incremental path measurement during normal error-free operation and during the emergency run in case of two uniformly erroneous measurement signals.

The graphic comparison shows that an accuracy of incremental path measurement of +/− one increment is attained during the emergency run.

The object of this method is attained also by a device for triggering an electric motor containing an electric motor with a rotor and a computer or control unit with a device for the acquisition and storage as well as the analysis of electronic sensor signal patterns to determine the position and direction of rotation of the rotor as well as sensor means for acquisition of same, whereby the electric motor can be triggered by the computer or control unit as a function of the position and the direction of rotation of the rotor.

The electric motor displays the following in a practical manner: An incremental path measurement to determine the position of the servo component that can be driven by the electric motor and a device in the computer or control unit to correct the counting of the increments as a function of the presence of at least one sensor signal error.

What is claimed is:

1. A method for triggering an electric motor, especially an electronically commutated motor with a rotor, where a position and a direction of rotation of the rotor are acquired by electronic sensor signals, where the acquired sensor signals are read in as a decimal equivalent and where one rotation of the rotor is acquired by a certain sequence of decimal equivalents and the electric motor is triggered as a function of the position and the direction of rotation of the rotor, comprising:
    operating the motor for a plurality of rotations;
    comparing first acquired sensor signals for a first rotation of the motor with a pattern of sensor signals selected from the group consisting of stored sensor signals and second acquired sensor signals for a second rotation of the motor subsequent to the first rotation of the motor;
    detecting at least one erroneous sensor signal as a difference between the first acquired sensor signals and the pattern of sensor signals; and,
    triggering the electric motor by way of an emergency run as a function of the at least one erroneous sensor signal.

2. The method according to claim 1, wherein said at least one erroneous sensor signal exists when the sequence contains at least one decimal equivalent that has a predetermined value which deviates from a predetermined expectancy value.

3. The method according to claim 2, wherein said at least one erroneous sensor signal exists when the sequence consists of two decimal equivalents and when the decimal equivalent displays a predetermined value that deviates from said predetermined expectancy value.

4. The method according to claim 3, wherein the direction of rotation of the rotor is recognized by the sequence of the decimal equivalents that are read in.

5. The method according to claim 2, wherein two uniformly erroneous sensor signals exist when the sequence consists of two said decimal equivalents and when one of said decimal equivalents displays a predetermined value that deviates from said predetermined expectancy value.

6. The method according to claim 2, wherein in a presence of said at least one erroneous sensor signal, the electric motor is triggered with a substitute value that is formed for the decimal equivalent that displays said predetermined value.

7. The method according to claim 6, wherein the substitute value is calculated.

8. The method according to claim 7, wherein when said erroneous sensor signal exists, the substitute value is calculated according to the following formula:

$$EW=7-x$$

whereby EW designates the substitute value and X indicates a decimal value of a correctly acquired decimal equivalent from the sequence and a magnitude of X corresponds to a decimal value of the decimal equivalent that in a counting sequence is read in with the predetermined value as a second-in-line of the acquired sequence according to the decimal equivalent displaying the predetermined value.

9. The method according to claim 7, wherein when there are two uniformly erroneous sensor signals, the substitute value is calculated according to the formula:

$$EW=7-x$$

whereby EW designates the substitute value and X indicates a the decimal value of a correctly acquired decimal equivalent from the sequence and a magnitude of X corresponds to a decimal value of the decimal equivalent that is read in with the predetermined value during a counterphase to the decimal equivalent displaying the predetermined value.

10. The method according to claim 1, wherein two unevenly erroneous sensor signals exist when the acquired sequence consists of two correctly read-in decimal equivalents and when a plausibility test shows an error.

11. The method according to claim 1, wherein when at least one erroneous sensor signal exists, the electric motor is triggered in at least one acquired state with at least one alterable substitute value during a plurality of time intervals with predetermined time duration.

12. The method according to claim 11, wherein when said at least one erroneous sensor signal exists and when two states with a same decimal value are acquired, the electric motor is triggered with alterable substitute values during two time intervals, whereby a mentioned time duration in each case corresponds to a time duration of a last correctly acquired state.

13. The method according to claim 11, wherein when two erroneous sensor signals *exist*, the electric motor is triggered during each acquired state with said at least one alterable substitute value in the course of three time *intervals*, whereby a time duration in each case corresponds to *one-third* of a the time duration of a last acquired *state*.

14. The method according to claim 13, wherein when two unevenly erroneous sensor signals exist, the electric motor is triggered with said substitute value that corresponds in a disturbed 2-bit state to a the value of an the undisturbed sensor signal and said substitute value in a disturbed 1-bit state corresponds to a sum of valences of two disturbed sensor signals.

15. The method according to claim 2, wherein a counting of increments of an incremental path measurement is corrected in a presence of said at least one erroneous sensor signal by way of an incremental path measurement to determine a position of a servo component that can be driven by the electric motor, whereby a change of each decimal equivalent is counted as one increment.

16. The method according to claim 15, wherein in the presence of said at least one erroneous sensor signal, two increments are counted upon each change to and from the predetermined value.

17. The method according to claim 15, wherein when two erroneous sensor signals exist, three increments are counted upon each change of a decimal equivalent.

18. A device to implement the method according to claim 1 containing an electric motor with a rotor and a computer or control unit with a device for acquisition and storage as well as analysis of electronic sensor signal patterns to determine a position and a direction of rotation of the rotor as well as sensor means for acquisition of same, whereby the electric motor can be triggered by the computer or control unit as a function of the position and the direction of rotation of the rotor and the computer or control unit displays a device for recognition of at least one sensor signal error, wherein said device:

operates the motor for a plurality of rotations;

compares first acquired sensor signals for a first rotation of the motor with a pattern of sensor signals selected from the group consisting of stored sensor signals and second acquired sensor signals for a second rotation of the motor subsequent to the first rotation of the motor;

detects at least one erroneous sensor signal as a difference between the first acquired sensor signals and the pattern of sensor signals; and, triggers said electric motor as a function of a presence of the at least one sensor signal error in the course of an emergency run.

19. The device according to claim 18, wherein the electric motor displays an incremental path measurement to determine a position of a servo component that can be driven by the electric motor and the computer or control unit contains a device for correction of a counting of increments as a function of the presence of at least one sensor signal error.

* * * * *